United States Patent
Chen et al.

(10) Patent No.: US 12,118,560 B2
(45) Date of Patent: Oct. 15, 2024

(54) POINTER MOVEMENT MODELLING FOR ENTITY CLASSIFICATION

(71) Applicant: PayPal, Inc., San Jose, CA (US)

(72) Inventors: Zhe Chen, Singapore (SG); Hewen Wang, Singapore (SG); Solomon Kok How Teo, Singapore (SG); Yuzhen Zhuo, Singapore (SG); Quan Jin Ferdinand Tang, Singapore (SG); Mandar Ganaba Gaonkar, Fremont, CA (US); Omkumar Mahalingam, Santa Clara, CA (US); Kenneth Bradley Snyder, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 199 days.

(21) Appl. No.: 17/651,081

(22) Filed: Feb. 15, 2022

(65) Prior Publication Data
US 2023/0259943 A1 Aug. 17, 2023

(51) Int. Cl.
*G06Q 40/00* (2023.01)
*G06F 3/01* (2006.01)
(Continued)

(52) U.S. Cl.
CPC ......... *G06Q 20/4016* (2013.01); *G06F 3/017* (2013.01); *G06F 3/0304* (2013.01);
(Continued)

(58) Field of Classification Search
CPC ............... G06Q 40/00; G06Q 20/4016; G06Q 20/40145; G06N 20/20; G06F 3/017; G06F 18/217; G06F 3/0304
See application file for complete search history.

(56) References Cited

U.S. PATENT DOCUMENTS 9,792,462 B2 * 10/2017 Almalki ................ H04W 4/021
11,882,118 B2 * 1/2024 Larson ................ H04L 63/0478
(Continued)

FOREIGN PATENT DOCUMENTS

IN 202111009704 A * 3/2021
WO 2021102126 A1 5/2021

OTHER PUBLICATIONS

Clustering Web Users By Mouse Movement to Detect Bots and Botnet Attacks JL Morgan—2021—digitalcommons.calpoly.edu (Year: 2021).*

(Continued)

*Primary Examiner* — Lalita M Hamilton
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to determining whether to authorize a requested action based on whether an entity is an automated computer. In some embodiments, a computer system tracks, at a user interface of a computing device, a sequence of pointer movements. The computer system maps, based on coordinate locations of pointer movements in the sequence, respective movements in the sequence to a plurality of functional areas. Based on the mapping, the computer system generates a movement graph and determines, based on the movement graph, whether an entity associated with the sequence of pointer movements is an automated computer. In response to receiving a request to authorize an action at the computing device, the computer system generates, based on the determining, an authorization decision for the action and transmits the authorization decision to the computing device. Determining whether the entity is an automated computer may advantageously prevent fraudulent activity.

20 Claims, 8 Drawing Sheets

(51) Int. Cl.
*G06F 3/03* (2006.01)
*G06F 18/21* (2023.01)
*G06N 20/20* (2019.01)
*G06Q 20/40* (2012.01)

(52) U.S. Cl.
CPC ........... *G06F 18/217* (2023.01); *G06N 20/20* (2019.01); *G06Q 20/40145* (2013.01)

(56) References Cited

U.S. PATENT DOCUMENTS

| | | |
|---|---|---|
| 2016/0180083 A1 | 6/2016 | Costigan et al. |
| 2017/0017781 A1* | 1/2017 | Turgeman ................ H04L 63/08 |
| 2017/0054702 A1* | 2/2017 | Turgeman ................ G06F 21/31 |
| 2018/0255077 A1 | 9/2018 | Paine |
| 2019/0070512 A1 | 3/2019 | Fuller et al. |
| 2020/0394658 A1 | 12/2020 | Chen |
| 2021/0112080 A1 | 4/2021 | Chen |
| 2021/0248443 A1 | 8/2021 | Shu et al. |
| 2021/0304741 A1 | 9/2021 | Cavallari et al. |
| 2021/0350516 A1 | 11/2021 | Tang et al. |
| 2021/0357441 A1 | 11/2021 | Zhuo et al. |
| 2021/0389817 A1 | 12/2021 | Spinelli et al. |
| 2021/0406883 A1 | 12/2021 | Gaonkar et al. |
| 2022/0404949 A1* | 12/2022 | Berquam ................ G06F 3/011 |

OTHER PUBLICATIONS

International Search Report and Written Opinion for Application No. PCT/US2023/062174 mailed on May 9, 2023, 16 pages.

* cited by examiner

*Sets of Features 582*

$$\begin{bmatrix} 0.4338, 0.2227, 0.3533, ..., 0.2217, 0.8014, 0.8519 \\ 0.6305, 0.1845, 0.7786, ..., 0.8983, 0.0371, 0.7032 \\ 0.3368, 0.6657, 0.4961, ..., 0.0683, 0.5151, 0.2737 \\ ..., \\ 0.3211, 0.6503, 0.6418, ..., 0.8220, 0.6359, 0.8705 \\ 0.6534, 0.3447, 0.9531, ..., 0.6319, 0.3411, 0.1133 \\ 0.6052, 0.1781, 0.5152, ..., 0.7357, 0.9370, 0.4500 \end{bmatrix}$$

*Matrix of n x d = 36 x 118*

*Sets of Regression Classifiers 544*

$$\begin{bmatrix} 0.0620, 0.0235, 0.0234, ..., 0.0803, 0.0929, 0.1038 \\ 0.2356, 0.2876, 0.3718, ..., 0.4137, -0.0789, -0.1228 \\ -0.1013, 0.0061, 0.1019, ..., 0.1434, -0.2576, -0.2334 \\ ..., \\ 0.1215, 0.2217, 0.3241, ..., 0.3466, -0.1828, -0.1349 \\ 0.0457, 0.0346, 0.0492, ..., 0.1224, -0.1361, -0.1690 \\ -0.0704, 0.0103, 0.0758, ..., 0.0216, -0.2015, -0.1441 \end{bmatrix}$$

*Matrix of n x d = 36 x 118*

*Set of Biometric Data 562*

$$\begin{bmatrix} 1.0013e+03, & 9.9560e+02, & 9.9114e+02, & 9.9150e+02, & 9.9662e+02, & 9.9662e+02, \\ -7.2181e+02, & -6.5136e+01, & -6.2403e+01, & -7.4745e+01, & -7.6504e+01, & 7.9707e-01, \\ -1.1283e-02, & 0.0000e+00, & -2.9476e-04, & 3.4117e-03, & -4.9199e-02, ..., & -4.9199e-00 \end{bmatrix}$$

*Matrix of 1 x d = 1 x 118*

*Fig. 5*

POINTER MOVEMENT MODELLING FOR ENTITY CLASSIFICATION

BACKGROUND

Technical Field

This disclosure relates generally to data security, and, more specifically, to techniques for detecting whether an entity is an automated computer e.g., to prevent authorization of suspicious (potentially malicious) actions initiated by automated computers.

Description of the Related Art

As more and more transactions are conducted electronically via online transaction processing systems, for example, these processing systems become more robust in managing transaction data as well as detecting suspicious and unusual behavior. Many user requests (e.g., login request, transaction requests, requests to access private data, etc.), for example, may be generated with malicious intent, which may result in wasted computer resources, network bandwidth, storage, CPU processing, monetary resources, etc., if those requests are processed. Some transaction processing systems attempt to analyze various user activity, including both previous and current user activity to identify and mitigate malicious behavior such as requests for fraudulent transactions.

BRIEF DESCRIPTION OF THE DRAWINGS

FIG. 5 is a diagram illustrating example functional area features, regression classifiers, and biometric data, according to some embodiments.

DETAILED DESCRIPTION

Figure 1:
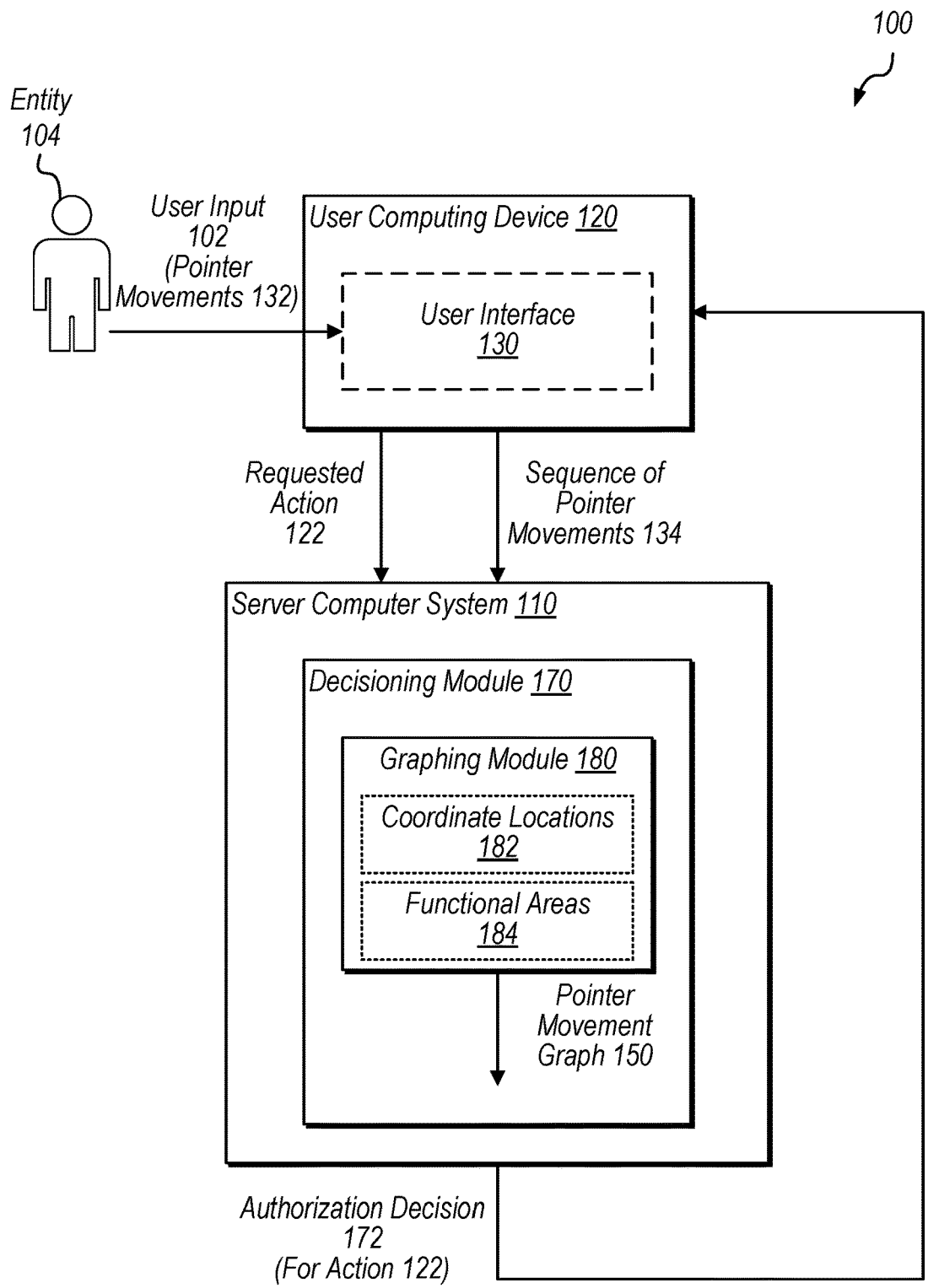
FIG. 1 is a block diagram illustrating an example system configured to identify whether an entity interacting with a user computing device is an automated computer, according to some embodiments.

Traditionally, fraud detection methods evaluate user activity relative to a requested action, e.g., initiation of an electronic transaction. Such methods generally observe various parameters associated with the initiated transaction such as the transaction location, devices involved, an amount of the transaction, prior suspiciousness history of the user requesting authorization of the transaction. In some situations, traditional risk detection techniques also evaluate user interface activity associated with a requested action, such as pointer movement. Such techniques, however, fail to accurately model pointer trajectory patterns, often relying solely on pointer movement values determined using physics (i.e., the acceleration of the pointer during a given time interval). Pointer movement values determined using physics are referred to herein as "pointer biometric data" or simply "pointer biometrics." In disclosed techniques a "pointer" may be an element displayed within the user interface of a device that allows an entity to provide input to the device, and the displayed element is controllable by the entity via a mouse, a stylist, a finger, an eye, verbal commands, etc.

Disclosed techniques determine both pointer trajectory patterns and pointer biometric features and combine these two sets of pointer features to determine whether an entity requesting an action (e.g., account login, transaction processing, to access private data, etc.) via a user interface of a computing device is an automated computer (robot) or a user (human). In particular, the disclosed techniques track a sequence of pointer movements at a user interface of a user computing device. This sequence of pointer movements is used to generate a movement graph by assigning individual pointer movements to different functional areas based on the coordinates of these pointer movements corresponding to the coordinate grids of the functional areas. This movement graph is input to a trained graph convolutional neural network that generates a set of regression classifiers. In addition to performing the convolution operations to generate regression classifiers from the pointer movement trajectories, the disclosed techniques calculate a set of pointer biometric data from the sequence of pointer movements tracked at the user interface. The disclosed techniques feed the set of pointer biometric data through the regression classifiers output by the graph convolution network (GCN). Feeding the biometric data through the regression classifiers includes performing a dot product of the biometric data and the regression classifiers, the result of which is a product vector representing the movement of the pointer in terms of both the trajectory pattern of the pointer and movement biometric information of the pointer.

Further in disclosed techniques, in response to an entity requesting to perform an action at the user computing device, a detection system inputs the product vector into a trained machine learning classifier, such as an extreme gradient boosting (XGBoost) classifier. A classification output by the classifier indicates whether the entity requesting the action at the user interface is a robot or a human. The disclosed risk evaluation system may then generate an authorization decision for the action requested via the user interface based on the output of the classifier and transmits the authorization decision to the user computing device. For example, the risk evaluation system may reject a transaction authorization request based on the disclosed techniques classifying the entity as a robot.

The disclosed techniques may advantageously allow systems to accurately detect suspicious behavior and proactively mitigate malicious actions. For example, after determining whether an entity requesting a transaction is a robot, a transaction processing system using the disclosed techniques and performing risk management may more easily detect whether this transaction is fraudulent. As one specific example, if the disclosed techniques detect that an entity is a robot, a risk detection system may reject a requested account login, deny an initiated transaction, block a signup request, etc. thus advantageously preventing or reducing fraudulent activity such as account takeovers. In some situations, using the disclosed techniques to detect whether robots are behind requested actions may advantageously allow a risk detection system to prevent or reduce cyber-attacks attempted by such robots.

Example Server Computer System

FIG. 1 is a block diagram illustrating an example system configured to identify whether an entity interacting with a user computing device is an automated computer. In the illustrated embodiment, a system 100 includes a user computing device 120 with a user interface 130 and a server computer system 110, which in turn includes a decisioning module 170.

In the illustrated embodiment, user computing device 120 receives user input 102 that include pointer movements 132 from an entity 104. For example, user input 102 may include movement of a pointer over user interface 130 including scrolling, clicking, hovering, sliding from one user interface object to another, etc. Pointer movements 132 are tracked by server computer system 110 at user interface 130 of user computing device 120 to generate a sequence 134 of pointer movements.

Server computer system 110, in the illustrated embodiment, executes a decisioning module 170 to generate an authorization decision for the requested action 122. Decisioning module 170 includes a graphing module 180 that generates a pointer movement graph 150 from the sequence 134 of pointer movements tracked at user interface 130. Respective pointer movements 132 included in sequence 134 include three fields: an x-coordinate, a y-coordinate, and a movement interval. Graphing module 180 determines coordinate locations 182 for respective pointer movements 132 in the sequence 134. For example, the x-coordinate of a given pointer movement is the horizontal location within user interface 130 of the pointer at the start of movement while the y-coordinate of the given pointer is the vertical location within user interface 130 of the pointer at the start of movement. Intervals are the times between consecutive movements 132 in the sequence. The decisioning module 170 attempts to determine, for a given sequence 134 of pointer movements m1, m2, . . . , mn, where mi=xi, yi, and intervali, whether the sequence of movements belongs to a human or a robot.

Graphing module 180 maps coordinate locations 182 corresponding to respective pointer movements 132 in sequence 134 into functional areas 184 within user interface 130. For example, system 110 tracks a sequence of pointer movements between different areas within user interface 130. As one specific example, for a sequence 134 of pointer movements falling within coordinates ranging from {x:0, y:0} to {x:100, y:100}, graphing module 180 generates 100 functional areas, where each functional area has a length and width of 10 resulting in the following functional areas: FA1: {x:0 to 10, y:0 to 10}, {x:1 0 to 20, y:10 to 20}, FA100: {x:90 to 100, y:90 to 100}. Based on mapping pointer movements to functional areas 184, graphing module 180 builds a pointer movement graph 150, by transforming each functional area into graph nodes and each pointer movement between functional areas into graph edges. Graphing of pointer movement is discussed in further detail below with reference to FIG. 2. In some embodiments, functional areas 184 include a point of interest displayed within user interface 130. For example, a point of interest within interface 130 may be a button, a search bar, an advertisement, an image of a product, a checkout button, a link, etc.

Based on the pointer movement graph 150, decisioning module 170 determines whether entity 104 is an automated computer. For example, the pointer movement graph 150 may indicate that the entity 104 utilizing device 120 is a robot. In response to the entity submitting a request via user interface 130 to perform an action 122 at device 120, decisioning module 170 generates an authorization decision 172 for the action. For example, the requested action 122 may include a request to authorize an initiated transaction, a request to log in to a user account, a request to access private data, or any of various requests requiring authorization from system 110 (which may be a risk detection system that is part of or interacts with an online transaction processing system). The decisioning performed by module 170 for an entity interacting with a user interface is discussed in further detail below with reference to FIG. 3.

In the illustrated embodiment, server computer system 110 transmits the authorization decision 172 to user computing device 120. For example, if the server computer system 110 detects that an entity is an automated computer, it may reject an initiated transaction, block user access to a given resource (e.g., private user data), log user computing device 120 out of a user account currently logged in on the device, deny access of device 120 to a user account entirely, etc.

Note that various examples herein classify an entity requesting authorization of an action at a user computing device based on pointer movement data, but these examples are discussed for purposes of explanation and are not intended to limit the scope of the present disclosure. In other embodiments, any of various user data, including transaction data, account data, credit data, identification data, etc. may be implemented used during a security analysis to determine whether an action requested by a user should be authorized, including determining whether the requested action is suspicious (and potentially malicious).

In this disclosure, various "modules" operable to perform designated functions are shown in the figures and described in detail (e.g., decisioning module 170, graphing module 180, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized application-specific integrated circuit (ASIC).

Example Pointer Movement Graphing

Figure 2:
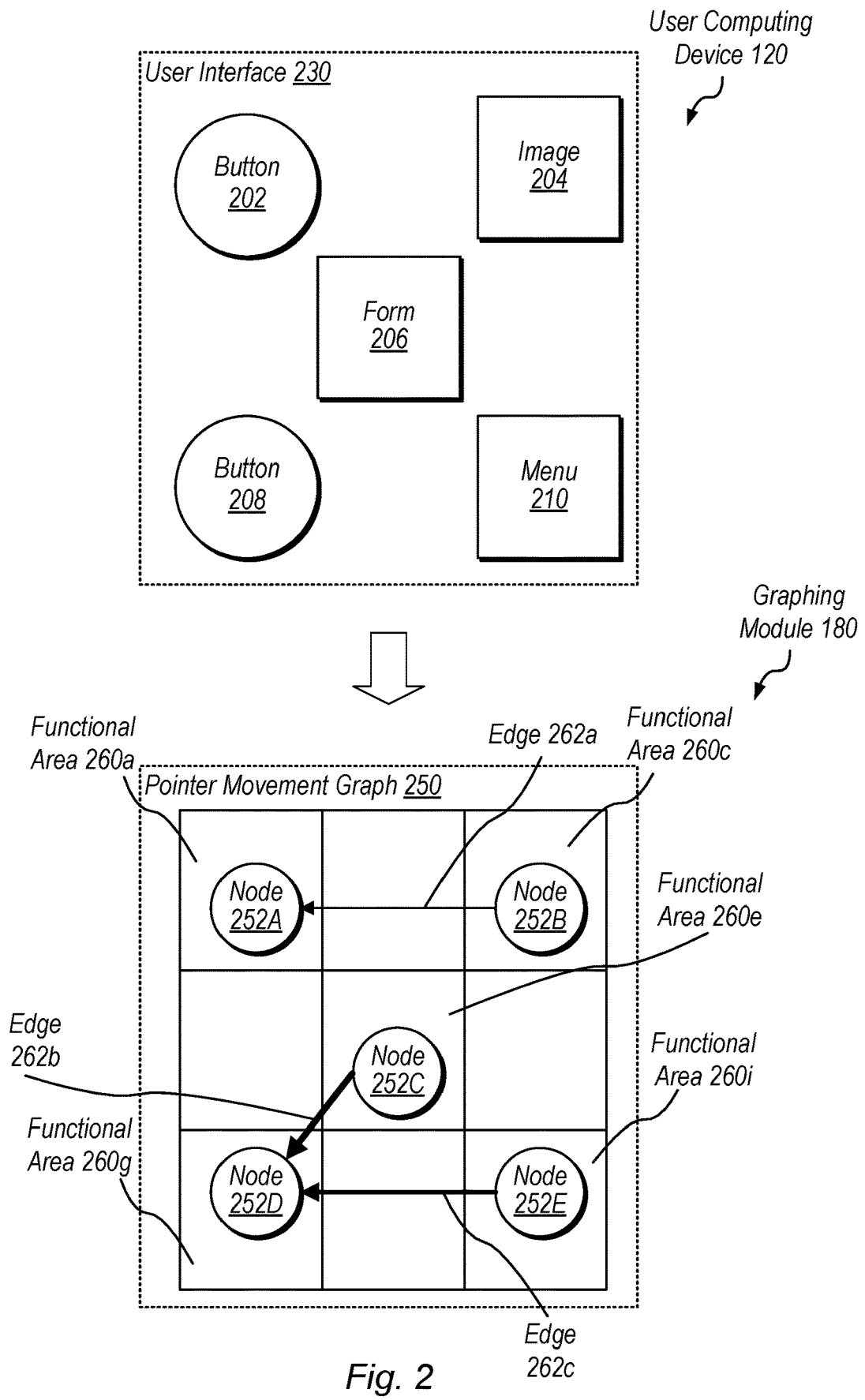
FIG. 2 is a block diagram illustrating an example user interface and an example pointer movement graph, according to some embodiments.

FIG. 2 is a block diagram illustrating an example user interface and an example pointer movement graph. In the illustrated embodiment, an example user interface 230 of user computing device 120 and an example pointer movement graph 250 generated by graphing module 180 from a sequence of pointer movements tracked at the user interface are shown.

User interface 230, in the illustrated embodiment, includes two different buttons 202 and 208, an image 204, a form 206, and a menu 210. For example, the interface elements 202-210 rendered in user interface 230 may be included in a webpage displayed via a web browser executed at user computing device 120. In this example, buttons 202 and 208 may be clicked by entity 104 to make selections, to navigate to another webpage, to initiate a transaction, to log in to an account, etc. Further in this example, image 204 may be a profile picture (associated with an account currently logged in on device 120), form 206 may be a shipping address form, menu 210 may be a drop-down list of payment options e.g., for an initiated transaction.

Pointer movement graph 250, in the illustrated embodiment, is one example of the pointer movement graph 150 that is generated by graphing module 180, shown in FIG. 1, by mapping a sequence of pointer movements between functional areas. Pointer movement graph 250 includes nine different functional areas 260a-260i generated by graphing module 180 for user interface 230. Several of the functional areas shown in FIG. 2 (i.e., area 260a, area 260c, area 260e, area 260g, and area 260i) include points of interest in user interface 230 (i.e., interface elements 202-210). Pointer movement graph 250 also includes several nodes 252A-252E representing the interface elements 202-210 included in user interface 230 and several edges 262a, 262b, and 262c representing a plurality of different pointer movements tracked at user interface 230.

In the illustrated embodiment, the plurality of different pointer movements between various interface elements represented via edges 262a, 262b, and 262c are shown as different arrows between nodes 252B and 252A, 252C and 252D, and 252E and 252D, respectively. A single pointer movement between node 252B and node 252A is shown as a thin arrow, while multiple pointer movements between nodes 252C and node 252D are represented by a much thicker arrow. For example, three, five, ten, etc. pointer movements between node 252C and node 252D may be tracked at user interface 230, resulting in a highly weighted edge being mapped between these two nodes. Similarly, several pointer movements are tracked between the interface elements represented by node 252E and node 252D and are represented by a highly weighted edge 262c within pointer movement graph 250. In disclosed techniques, the more movements between a pair of nodes, the higher the weight assigned by graphing module 180 to an edge representing these movements.

Example Regression Module

Figure 3:
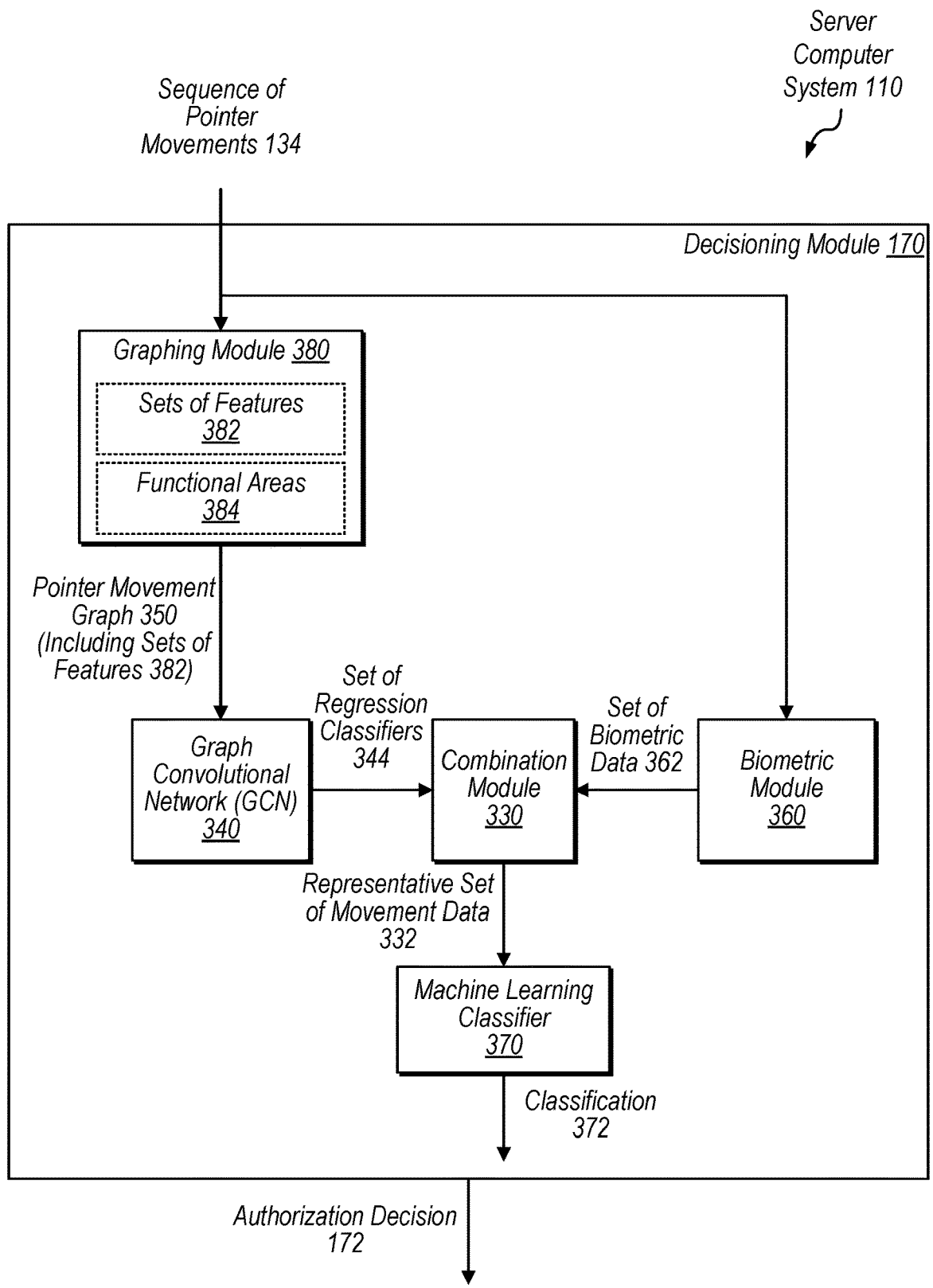
FIG. 3 is a block diagram illustrating an example decisioning module, according to some embodiments.

FIG. 3 is a block diagram illustrating an example decisioning module 170. In the illustrated embodiment, decisioning module 170 includes graphing module 380, graph convolutional network (GCN) 340, combination module 330, biometric module 360, and machine learning classifier 370.

Decisioning module 170, in the illustrated embodiment, inputs the sequence 134 of pointer movements tracked at a user interface (such as interface 130 shown in FIG. 1) into graphing module 380 and biometric module 360. Biometric module 150 generates a set 362 of biometric data based on the sequence 134 of pointer movements and sends this set 362 to combination module 330. As discussed in further detail below with reference to FIG. 4, biometric module 360 may calculate a plurality of different values from the sequence 134 to generate set 362 of biometric data.

Graphing module 380, in the illustrated embodiment, generates a pointer movement graph 350 by mapping coordinates of pointer movements included in the sequence 134 to functional areas 384. Graphing module 380 also determines sets of features 382 associated with pointer movements mapped to functional areas 384. In some embodiments, the sets of features 382 for the various functional areas 384 may be random vectors. These random vectors may be generated using any of various random generation functions or methods, such as the Python "numpy.random" method. In some situations, generation of random vectors may not be performed in a completely random manner. For example, the random vectors may be generated from the attributes associated with the different functional areas 384. In other embodiments, the sets of features 382 are built for each functional area by graphing module 380 and used in place of random vectors. For example, functional areas 384 with similar functions (e.g., two functional areas include a signup button) may have similar attributes and, thus, graphing module 380 may produce similar random vectors for these two functional areas.

Decision module 170, in the illustrated embodiment, inputs the pointer movement graph 350 into graph convolutional network 340. GCN 340 generates a set 344 of regression classifiers from the pointer movement graph 350 and the sets of features 382. For example, GCN 340 applies several layers of graph convolution to the pointer movement graph 350 to learn the representation of each functional area. In various situations, GCN 340 may include 1–N layers, with N being any whole number greater than two (e.g., the number of layers is a tunable parameter). GCN 340 outputs a matrix of size ("d×n") (d is the number of rows and n is the number of columns), where d is a predefined parameter (set to be the same number of dimensions as a number of dimensions in the set 362 of biometric data for ease of computation) and n is the number of functional areas. Each row of this matrix is an individual regression classifier (with d values). As such, GCN 340 outputs a set 344 of n classifiers. An example matrix of regression classifiers is shown in FIG. 5. Decisioning module 170 then inputs the set of regression classifiers 344 into combination module 330.

Combination module 330 outputs a representative set 332 of movement data generated based on set of regression classifiers 344 and set 362 of biometric data. For example, combination module 330 feeds set 362 of biometric data through set of regression classifiers 344 to generate a product vector (e.g., representative set 332 of movement data) that represents the pointer movement in sequence 134 in terms of both pointer trajectory patterns and pointer biometric patterns. As discussed herein, feeding the set 362 of biometric data through the set of regression classifiers 344 includes performing a dot product of (i.e., to concatenate) the biometric data and the classifiers. For example, if the set 362 of biometric data is a vector of size ("1×d") and the set of regression classifiers is a matrix of size ("d×n"), then the result of the dot product of these two matrices is a vector of size ("1×n") as shown in FIG. 5. The set of functional area representations generated by GCN act as a set of classifiers (regression functions) that process the movement biometrics included in set 362 of biometric data, where each representation of a functional area is an individual classifier.

Decisioning module 170, in the illustrated embodiment, inputs the representative set 332 of movement data into a machine learning classifier 370 which outputs a classification 372 for the representative set 332. As one specific example, classification 372 output by a classifier 370 may be a value on a scale of 0 to 1, where values close to 0 indicate that the pointer movement was generated by a human and values 1 indicates the pointer movement was generated by a robot. Machine learning classifier 370 may be any of various types of machine learning classifiers, including one or more of the following: extreme gradient boosting (XGBoost) classifier, adaptive boosting (AdaBoost) classifier, stochastic boosting classifier, gradient boosting classifier. In various embodiments, classifier 370 may be a non-boosting type of classifier, such as a neural network, a decision tree, a logistic regression model, etc. Based on classification 372, decisioning module 170 generates and outputs authorization decision 172.

Server computer system 110 trains GCN 340 and machine learning classifier 370 as a pipeline of machine learning models. For example, system 110 uses a given set of training data to train both GCN 340 and classifier 370. In various situations, system 110 retrieves historical user activity from a database and uses this historical user activity as training data. The historical user activity includes prior actions requested by different users at different computing devices as well as sequences of pointer movements corresponding to the prior requested actions that are tracked at user interfaces of the computing devices. For example, three different sequences of pointer movements may be tracked at three (of the same or different) user devices and each of these sequences corresponds to different sessions of a user (or users) interacting with user interfaces at these devices. System 110 maps each sequence of pointer movements (based on their respective coordinates) into a sequence of functional areas and summarizes these sequences of functional areas to build a single pointer movement graph for the historical sequences of pointer movements. System 110 then uses this single pointer movement graph to train a graph convolutional neural network by feeding the graph, sets of features corresponding to functional areas in the graph, and known labels (e.g., robot or human) for the sets of features into the graph convolutional neural network. The weights associated with various edges within the single pointer movement graph impact the training of the GCN. Once system 110 is satisfied with the training of the GCN, the system stores the trained GCN for use in generating sets of regression classifiers for future sequences of pointer movements.

Further, system 110 trains a machine learning classifier by inputting product vectors generated by performing a dot product on regression classifiers output by the trained GCN and sets of biometric data generated from the historical sequences of pointer movements retrieved from the database. System 110 also inputs known labels corresponding to the product vectors and indicating whether respective historical sequences of pointer movements are associated with a human or a robot. System 110 adjusts weights of the classifier based on classifications output by the classifier (for respective product vectors) diverging from the known labels. Once system 110 is satisfied with the training of the classifier (e.g., based on its output classifications being similar to known labels), the system saves the trained classifier for use in predicting whether future entities requesting actions are robots or humans.

Example Biometric Data

Figure 4:
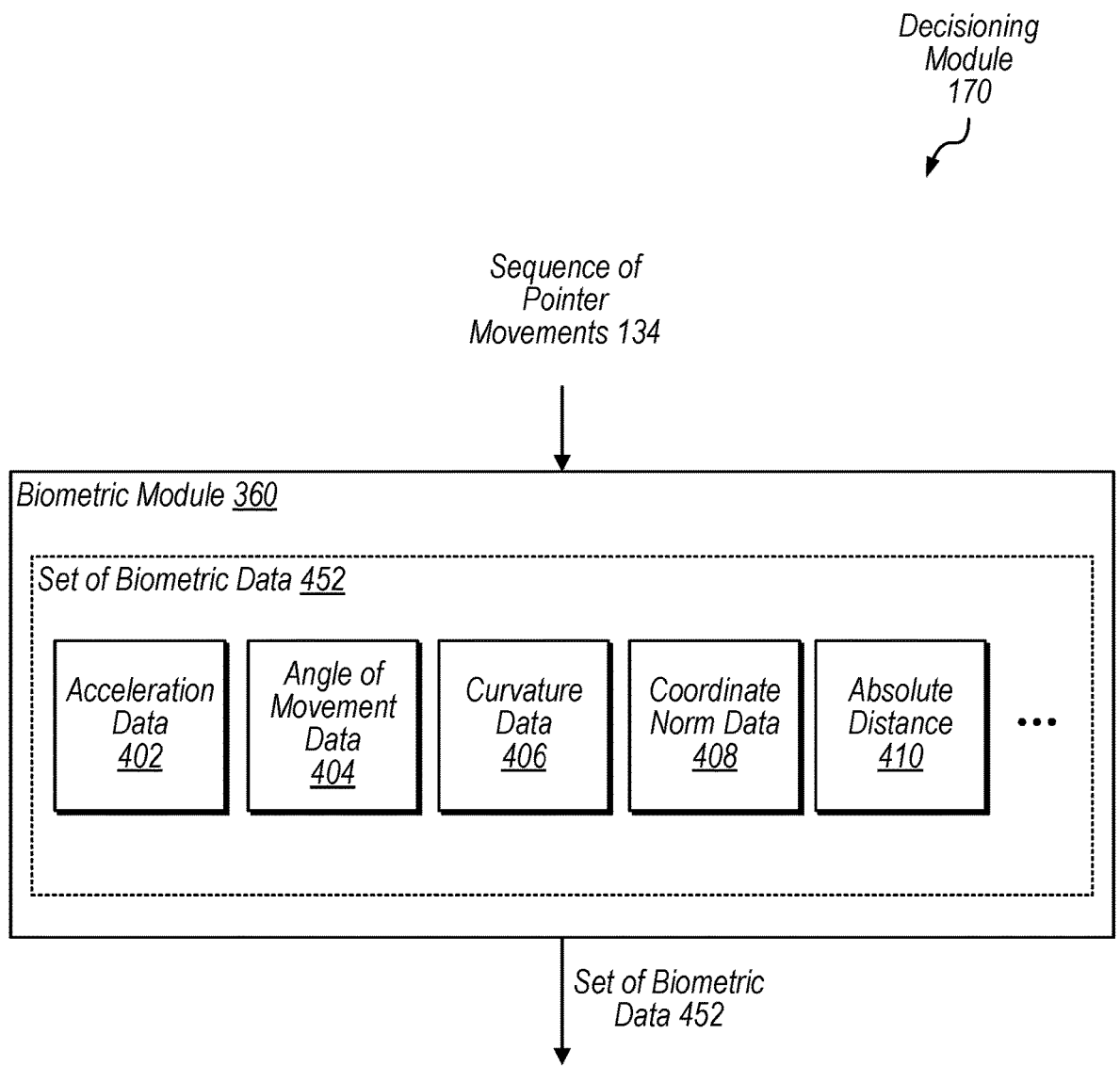
FIG. 4 is a block diagram illustrating example biometric data, according to some embodiments.

FIG. 4 is a diagram illustrating example biometric data. In the illustrated embodiment, biometric module 360 generates and outputs a set 452 of biometric data. In the illustrated embodiment, biometric module 360 generates set 452 of biometric data from the sequence 134 of pointer movements tracked at user computing device 120 (shown in FIG. 1).

In the illustrated embodiment, the set 452 of biometric data includes values for a plurality of biometric features, including: acceleration data 402, angle of movement data 404, curvature data 406, coordinate norm data 408, and absolute distance 410. For example, biometric module 360 may determine, for respective pointer movements in the sequence 134, an average acceleration, an angle at which the pointer moves over user interface 130, curvature, starting x- and y-coordinate values, ending x- and y-coordinate values, absolute (norm) coordinate values at various points during pointer movement, an absolute distance moved by the pointer between a starting and ending location within the user interface 130, etc.

Biometric module 360 may generate any of various types of biometric data not illustrated in FIG. 4, including a maximum time interval that the pointer was moving for a given sequence of pointer movements, a time interval for respective movements within the sequence, etc. The example list of biometric features shown in FIG. 4 are not intended to limit the scope of the present disclosure and, as such, any of various types of biometric features may be generated by biometric module 360 for use in detection of a robot operating a user computing device 120.

Example Pointer Movement Data

FIG. 5 is a diagram illustrating example functional area features, regression classifiers, and biometric data. In the illustrated embodiment, an example set of features 582, an example set of regression classifiers 544, and an example set of biometric data 562 are shown.

In the illustrated embodiment, the example set of features 582 corresponding to functional areas of a pointer movement graph (such as graph 350) are included in a matrix of size ("n×d"), where n is 36 and d is 118. In this example, the matrix of features includes 36 different sets (corresponding to 36 different functional areas within a pointer movement graph) where each set includes 118 features. The parameter "d" is a hyperparameter that can be tuned according to performance requirements.

In the illustrated embodiment, the example set of regression classifiers 544 are included in a matrix of size ("n×d"), where n is 36 and d is 118 similar to the matrix of functional area features. Each column of the matrix of regression classifiers 544 is an individual regression classifier. In order to perform matrix computations on the matrix of regression classifiers 544, the disclosed techniques transpose the matrix and then perform a dot product of the transposed matrix with the matrix of a set of biometric data 562. An example matrix including a set of biometric data 562 is also shown in FIG. 5. This matrix of size ("1×d"), where d is 118 includes a single vector with one row of 118 biometric features. The vector resulting from performing the dot product on the matrix of regression classifiers 544 and the matrix of the set of biometric data 562 is a vector of size ("1×154"). In disclosed techniques, the vector of size ("1×154") is one example of the representative set of movement data 332 that is input into machine learning classifier 370 to predict whether a sequence of pointer movements corresponds to a robot.

Example Risk Detection System

Figure 6:
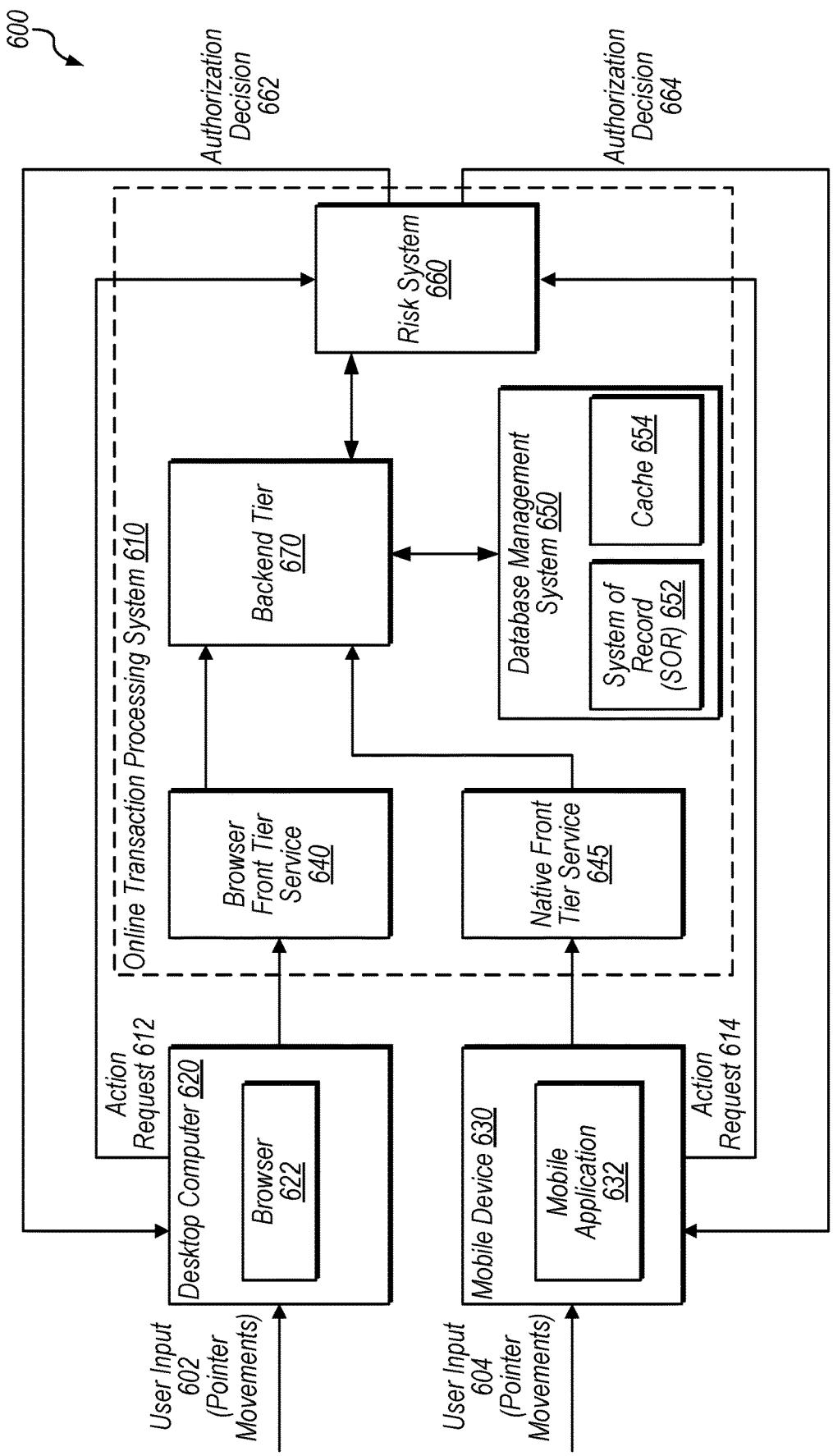
FIG. 6 is a diagram illustrating a detailed example of a risk detection system, according to some embodiments.

FIG. 6 is a diagram illustrating a detailed example of a risk detection system 600. In the illustrated embodiment, system 600 includes desktop computer 620, mobile device 630, online transaction processing system 610, which in turn includes browser front tier service 640, native front tier service 645, backend tier 670, database management system 650, and risk system 660.

In the illustrated embodiment, desktop computer 620 receives user input 602 via a browser 622 that includes pointer movements. This user input 602 is tracked at the browser 622 (rendered via a user interface of desktop computer 620) and sent to the browser front tier service 640 of a risk detection system 610. Similarly, in the illustrated embodiment, mobile device 630 receives user input 604 via mobile application 632 that includes pointer movements. This user input 604 is tracked at the mobile application (rendered via a user interface of mobile device 630) and transmitted to native front tier service 645. The browser 622 executes integrated scripts, such as a software development kit (SDK), provided by browser front tier service 640 to render a webpage and track user input 602 to the webpage (similar integrated scripts are provided by native front tier service 645 to mobile application 632). For example, upon load of a webpage at browser 622, the integrated script collects data from desktop computer 620 including user input 602.

Both the browser front tier service 640 and the native front tier service 645 pass the tracked pointer movements to the backend tier 670, which in turn stores the pointer data by database management system 650 via a system of record (SOR) 652 or cache 654 included in system 610. In some embodiments, database management system 650 is executed separately from the risk detection system 610 and is accessed by risk detection system 610 to store and retrieve pointer data for use in the disclosed techniques.

In the illustrated embodiment, the user input 602 and 604 include respective requested actions 612 and 614 that trigger a determination by the risk detection system 610 whether entities associated with respective user input 602 and 604 correspond to a robot or a human. In response to the requested actions 612 and/or 614 (e.g., a transaction request, signup request, login request, etc.), the risk system 660 included in online transaction processing system 610 makes a call to the database management system 650 to retrieve classifications indicating whether entities requesting the actions 612 and 614 are automated computers. Based on the retrieved classifications, risk system 660 generates and transmits authorization decisions 662 and 664 (e.g., challenge, block, approve, etc. the requested action) to respective devices 620 and 630.

Example Method

Figure 7:
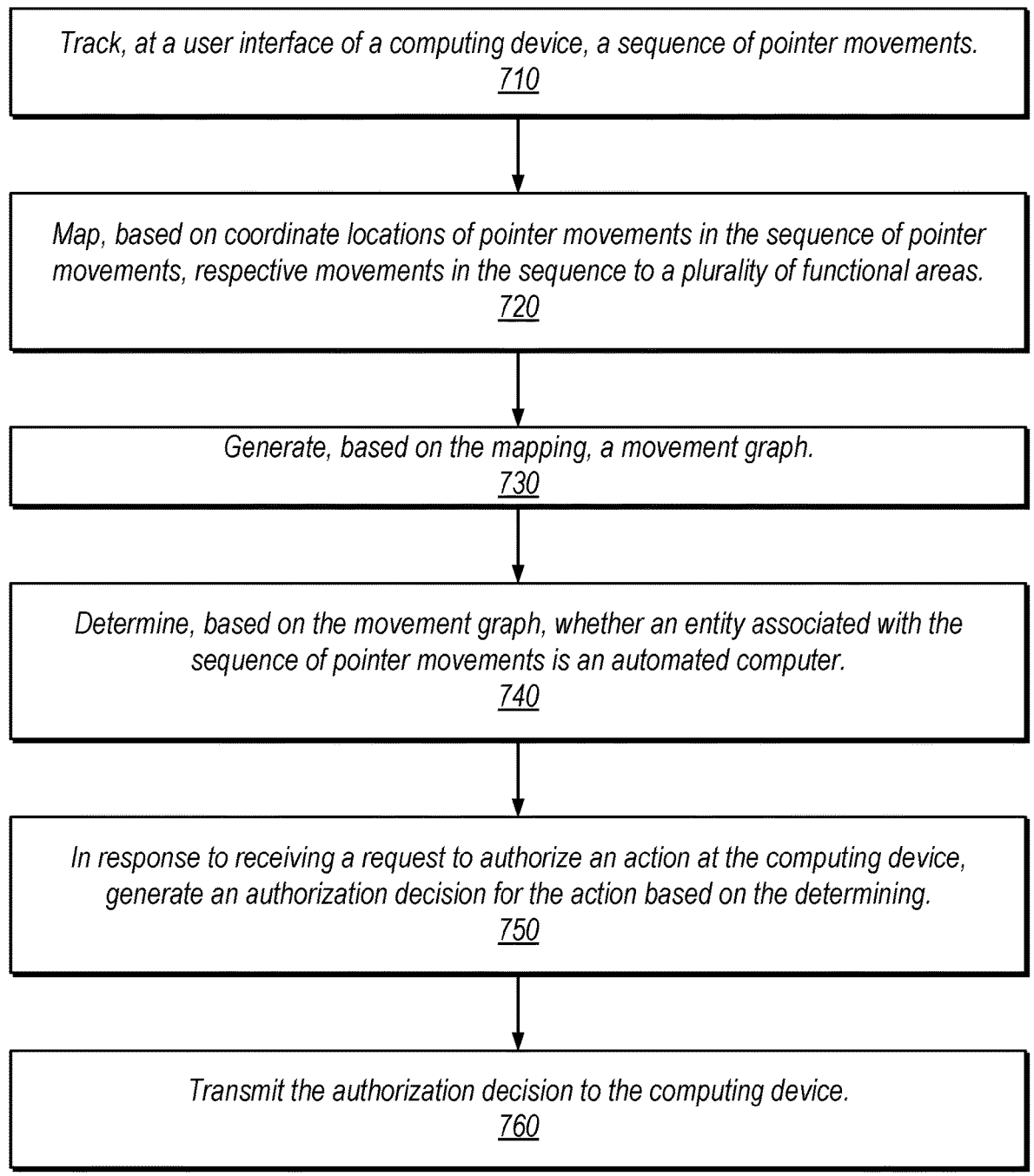
FIG. 7 is a flow diagram illustrating a method for determining whether an entity requesting authorization of an action at a user computing device is an automated computer, according to some embodiments.

FIG. 7 is a flow diagram illustrating a method for determining whether an entity requesting authorization of an action at a user computing device is an automated computer, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 700 is performed by server computer system 110 or risk detection system 600.

At 710, in the illustrated embodiment, a server computer system tracks, at a user interface of a computing device, a sequence of pointer movements. In some embodiments, respective pointer movements in the sequence include a starting x-coordinate, a starting y-coordinate, and an interval of movement.

At 720, the server computer system maps, based on coordinate locations of pointer movements in the sequence of pointer movements, respective movements in the sequence to a plurality of functional areas. In some embodiments, one or more of the plurality of functional areas include a point of interest within the user interface.

At 730, the server computer system generates a movement graph based on the mapping performed at element 720. In some embodiments, the server computer system inputs the movement graph into a first machine learning model. In some embodiments, the server computer system generates, based on output of the first machine learning model, a representative set of pointer movement data. In some embodiments, the server computer system inputs, the representative set of pointer movement data into a second, different machine learning model, where the determining whether the entity is an automated computer is further based on output of the second, different machine learning model. In some embodiments, the first machine learning model is a graph convolutional neural network and the second, different machine learning model is an extreme gradient boosting classifier.

In some embodiments, the second different machine learning model is generated by generating, generating, from a plurality of historical sequences of pointer movements tracked via a user interface of a plurality of computing devices, a plurality of representative sets of movement data and inputting the plurality of representative sets of movement data into the second, different machine learning model. In some embodiments, the second model is further generated by adjusting, based on output of the second, different machine learning model for the representative sets of movement data and known labels for the historical sequences of pointer movements corresponding to the representative sets of movement data, one or more weights of the second, different machine learning model.

In some embodiments, the first machine learning model is a graph convolutional network (GCN), and where the GCN is trained by generating, from a plurality of historical sequences of pointer movements tracked via user interfaces of a plurality of computing devices, a historical movement graph. In some embodiments, the first model is further trained by inputting the historical movement graph into the GCN, where the GCN includes at least two neural network layers. In some embodiments, the server computer system generates, a set of pointer biometric data based on the sequence of pointer movements. In some embodiments, output of the first machine learning model for the movement graph is a set of regression classifiers and generating the representative set of movement data includes performing a dot product of the set of regression classifiers and the sequence of pointer movements. In some embodiments, generating the set of pointer biometric data includes calculating one or more of the following biometric features for respective pointer movements included in the sequence of pointer movements: movement speed, movement acceleration, movement directions, and movement intervals, and movement distance.

At 740, the server computer system determines, based on the movement graph, whether an entity associated with the sequence of pointer movements is an automated computer. In some embodiments, generating the movement graph includes assigning graph nodes to respective functional areas included in the plurality of functional areas. In some embodiments, generating the movement graph includes assigning graph edges to respective pointer movements in a sequence of pointer movements between respective functional areas included in the plurality of functional areas, where weights assigned to graph edges are based on a number of pointer movements between pairs of functional areas.

At 750, in response to receiving a request to authorize an action at the computing device, the server computer system generates an authorization decision for the action based on the determining at element 740. For example, if the movement graph indicates that pointer movements at the computing device follow a known pattern (e.g., based on both biometric and trajectory data), then the server computer system may determine that the entity interacting with computing device is a robot.

At 760, the server computer system transmits the authorization decision to the computing device. For example, the server computer system may block or restrict user activity at computing device, require authentication information from an entity of the device, reject the requested action, etc.

Example Computing Device

Figure 8:
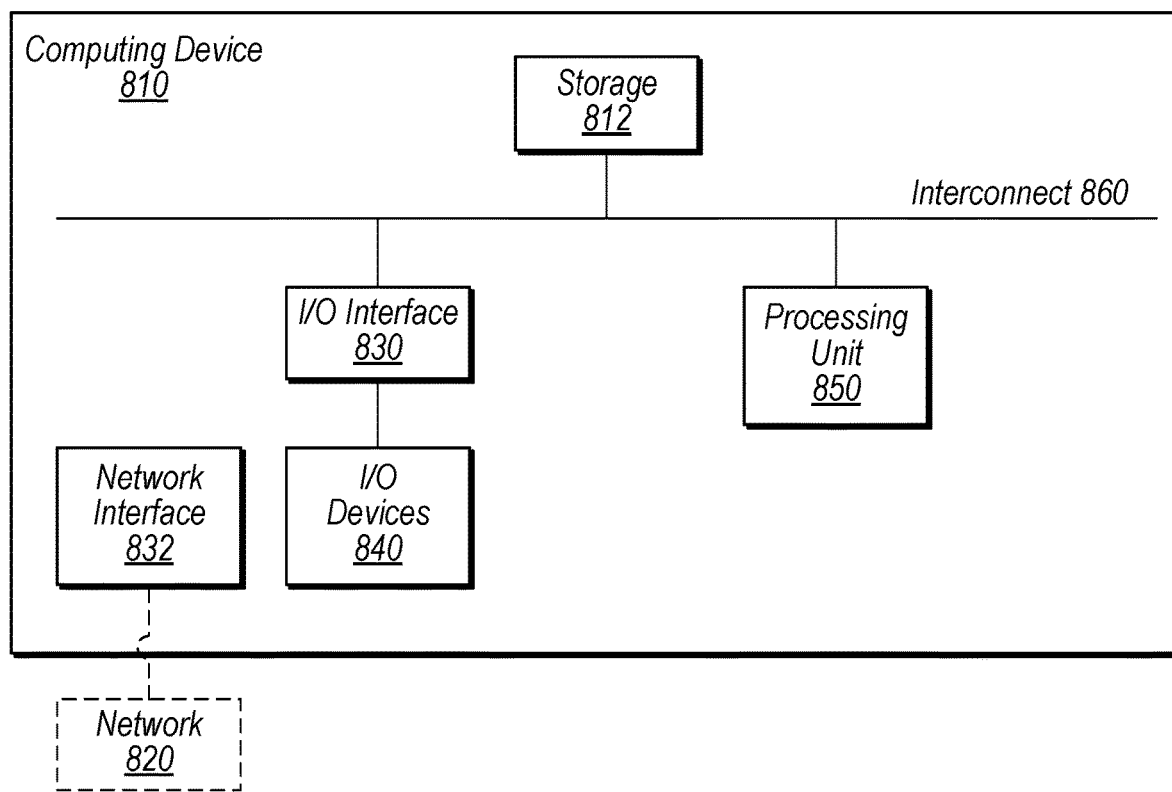
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
    tracking, by a server computer system based on pointer movement information identified at a mobile application rendered at a user interface of a mobile device, a sequence of pointer movements, wherein the pointer movement information is transmitted from the mobile device to the server computer system;
    mapping, by the server computer system based on coordinate locations of pointer movements in the sequence of pointer movements, respective movements in the sequence to a plurality of functional areas;

generating, by the server computer system based on the mapping, a movement graph, wherein the generating includes:
assigning graph nodes to respective functional areas included in the plurality of functional areas; and
assigning graph edges to respective pointer movements in the sequence of pointer movements between respective functional areas included in the plurality of functional areas, wherein weights assigned to graph edges are based on a number of pointer movements between pairs of functional areas;

determining, by the server computer system based on the movement graph, whether an entity associated with the sequence of pointer movements is an automated computer;

in response to receiving a request to authorize an action at the mobile device, generating, by the server computer system based on the determining, an authorization decision for the action; and transmitting, by the server computer system to the mobile device, the authorization decision.

2. The method of claim 1, further comprising:
inputting, by the server computer system, the movement graph into a first machine learning model;
generating, by the server computer system based on output of the first machine learning model, a representative set of pointer movement data; and
inputting, by the server computer system, the representative set of pointer movement data into a second, different machine learning model, wherein the determining whether the entity is an automated computer is further based on output of the second, different machine learning model.

3. The method of claim 2, wherein the second, different machine learning model is generated by:
generating, from a plurality of historical sequences of pointer movements tracked via user interfaces of a plurality of computing devices, a plurality of representative sets of movement data;
inputting the plurality of representative sets of movement data into the second, different machine learning model; and
adjusting, based on output of the second, different machine learning model for the representative sets of movement data and known labels for the historical sequences of pointer movements corresponding to the representative sets of movement data, one or more weights of the second, different machine learning model.

4. The method of claim 2, wherein the first machine learning model is a graph convolutional network (GCN), and wherein the GCN is trained by:
generating, from a plurality of historical sequences of pointer movements tracked via user interfaces of a plurality of computing devices, a historical movement graph; and
inputting the historical movement graph into the GCN, wherein the GCN includes at least two neural network layers.

5. The method of claim 2, further comprising:
generating, by the server computer system based on the sequence of pointer movements, a set of pointer biometric data.

6. The method of claim 5, wherein output of the first machine learning model for the movement graph is a set of regression classifiers, and wherein generating the representative set of movement data includes:
performing a dot product of the set of regression classifiers and the sequence of pointer movements.

7. The method of claim 5, wherein generating the set of pointer biometric data includes calculating one or more of the following biometric features for respective pointer movements included in the sequence of pointer movements: movement speed, movement acceleration, movement directions, movement intervals, and movement distance.

8. The method of claim 1, wherein the sequence of pointer movements are consecutive pointer movements within the user interface of the mobile device, and wherein the map of the sequence of pointer movements corresponds to a pointer trajectory.

9. The method of claim 1, wherein one or more of the plurality of functional areas include a point of interest within the user interface.

10. A non-transitory computer-readable medium having instructions stored thereon that are executable by a server computer system to perform operations comprising:
tracking, based on pointer movement information identified at a browser rendered at a user interface of a desktop computer, a sequence of pointer movements, wherein the pointer movement information is transmitted from the desktop computer to the server computer system;
mapping, based on coordinate locations of pointer movements in the sequence of pointer movements, respective movements in the sequence to a plurality of functional areas;
generating a movement graph based on the mapping, wherein the generating includes:
assigning graph nodes to respective functional areas included in the plurality of functional areas; and
assigning graph edges to respective pointer movements in the sequence of pointer movements between respective functional areas included in the plurality of functional areas;
determining, based on output of the movement graph, whether an entity associated with the sequence of pointer movements is an automated computer;
in response to receiving a request to authorize an action at the desktop computer, generating an authorization decision for the action based on the determining; and
transmitting, to the desktop computer, the authorization decision.

11. The non-transitory computer-readable medium of claim 10, wherein the operations further comprise:
inputting the movement graph into a first machine learning model;
generating, based on output of the first machine learning model, a representative set of pointer movement data; and
inputting the representative set of pointer movement data into a second, different machine learning model, wherein the determining whether the entity is an automated computer is further based on output of the second, different machine learning model.

12. The non-transitory computer-readable medium of claim 11, wherein the first machine learning model is a graph convolution network (GCN), and wherein the GCN is trained by:
generating, from a plurality of historical sequences of pointer movements tracked via user interfaces of a plurality of computing devices, a historical movement graph; and inputting the historical movement graph into the GCN, wherein the GCN includes at least three neural network layers.

13. The non-transitory computer-readable medium of claim 11, wherein the operations further comprise:
generating, based on the sequence of pointer movements, a set of pointer biometric data.

14. The non-transitory computer-readable medium of claim 12, wherein output of the first machine learning model for the movement graph is a set of regression classifiers, and wherein generating the representative set of movement data includes:
performing a dot product of the set of regression classifiers and the sequence of pointer movements.

15. The non-transitory computer-readable medium of claim 10,
wherein weights assigned to graph edges are based on a number of pointer movements between pairs of functional areas.

16. A system, comprising:
at least one processor; and
a memory having instructions stored thereon that are executable by the at least one processor to cause the system to:
track, at a user interface of a mobile device, a sequence of pointer movements, wherein the tracking is based on pointer movement information determined at a mobile application rendered via the user interface of the mobile device and transmitted from the mobile device to the system;
generate, based on the sequence of pointer movements, a movement graph, wherein the generating includes:
mapping, based on coordinate locations of pointer movements in the sequence of pointer movements, respective movements in the sequence to a plurality of functional areas;
assigning graph nodes to respective functional areas included in the plurality of functional areas; and
assigning graph edges to respective pointer movements in the sequence of pointer movements between respective functional areas included in the plurality of functional areas, wherein weights assigned to graph edges are based on a number of pointer movements between pairs of functional areas;
input the movement graph into a first machine learning model;
generate, based on output of the first machine learning model, a representative set of pointer movement data;
input the representative set of pointer movement data into a second, different machine learning model;
determine, based on output of the second, different machine learning model, whether an entity associated with the sequence of pointer movements is an automated computer;
in response to receiving a request to authorize an action at the mobile device, generate, based on the determining, an authorization decision for the action; and
transmit, to the mobile device, the authorization decision.

17. The system of claim 16, wherein one or more of the plurality of functional areas include a point of interest within the user interface.

18. The system of claim 17, wherein the sequence of pointer movements are consecutive pointer movements within the user interface of the mobile device, and wherein the map of the sequence of pointer movements corresponds to a pointer trajectory.

19. The system of claim 16, wherein the instructions are further executable by the at least one processor to cause the system to:
generate, based on the sequence of pointer movements, a set of pointer biometric data, wherein output of the first machine learning model for the movement graph is a set of regression classifiers, and wherein generating the representative set of movement data includes:
performing a dot product of the set of regression classifiers and the sequence of pointer movements.

20. The system of claim 16, wherein the second, different machine learning model is an extreme gradient boosting (XGBoost) classifier.

* * * * *